(No Model.)

H. W. & C. H. PRINDLE.
TWINE CARRIER.

No. 307,798. Patented Nov. 11, 1884.

Witnesses:
A. O. Skinner
A. E. Worster

Inventors.
Homer W. Prindle
Charles H. Prindle

United States Patent Office.

HOMER W. PRINDLE, OF FORT DODGE, AND CHARLES H. PRINDLE, OF HUMBOLDT, IOWA.

TWINE-CARRIER.

SPECIFICATION forming part of Letters Patent No. 307,798, dated November 11, 1884.

Application filed February 2, 1884. (No model.)

*To all whom it may concern:*

Be it known that we, HOMER W. PRINDLE and CHARLES H. PRINDLE, citizens of the United States, residing, respectively, at Fort Dodge, in the county of Webster and State of Iowa, and at Humboldt, in the county of Humboldt, in the State of Iowa, have invented a new and useful Improvement in Twine-Carriers, of which the following is a specification.

Our invention relates to that class of devices which are used for holding or carrying twine used for tying up small parcels—as, for example, in stores where goods are sold at retail; and the objects of our invention are to provide such a twine carrier or holder as will permit the twine to be drawn off at pleasure for use, and will, when the twine is broken off or released, withdraw it to such extent as to raise it and keep it out of the way when not in use.

Figure 1:
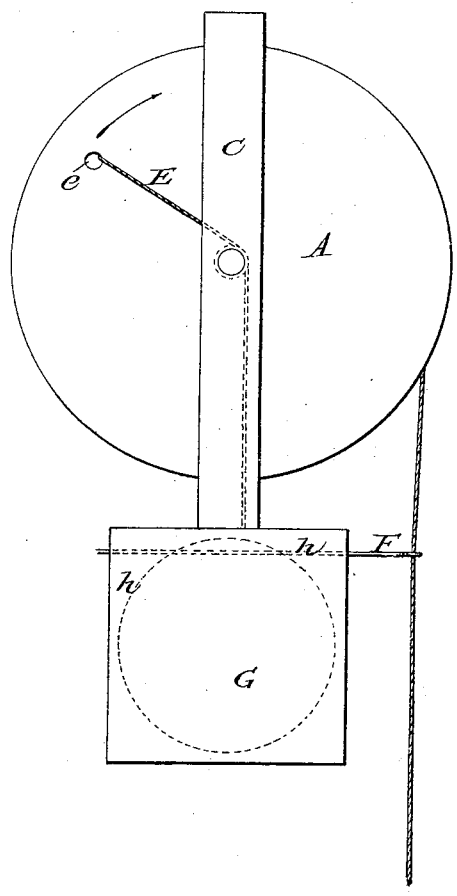
Figure 2:
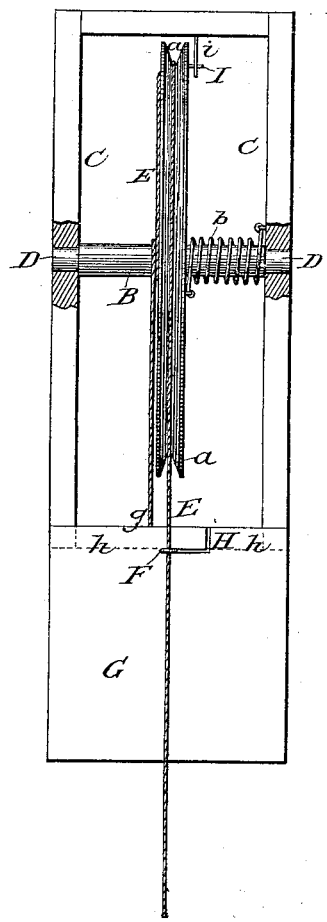

In the accompanying drawings, Figure 1 is a side elevation, and Fig. 2 a vertical section.

The same letters refer to the same parts in both views.

A, Fig. 1, is a wheel suspended upon the axis B, Fig. 2, and moving freely upon journals at D D, Fig. 2. The periphery of the wheel A is grooved, as shown by a, Fig. 2.

b, Fig. 2, is a spiral spring coiled around the axis B, fastened at its outer end in the frame c and at its inner end in the wheel A.

G is a receptacle for the ball of twine to be used, and E is the cord or twine.

e is a small hole in the edge of the wheel A, which passes through the edge of the wheel into the groove a.

H is an angle-slot and pin, or any suitable device, for fastening or attaching the ball-cup G so that it may be easily removed.

I, Fig. 2, is a pin in the side of the wheel A, which rests against the pin i in the frame c when the coil-spring b is relaxed.

The operation is as follows: The machine is suspended by the frame-work above the table or counter. The ball of twine is placed in the receptacle G. The end of the twine is passed through an eyelet at g, thence once coiled around the axis B, thence through the hole e into the groove a, thence around the wheel and down through the eyelet F to within convenient reach. When the twine is pulled down for use, the wheel A turns upon the axis B until the pin I strikes the pin i. The twine then slips freely on the wheel until all is drawn off that is required for use, when the twine is broken off and the end released. The coil-spring causes the wheel to turn back in the opposite direction until I strikes i again, and this movement of the wheel winds up the cord and raises the end a convenient distance above the counter, where it is within easy reach, yet out of the way.

We claim—

1. A device for holding or carrying twine used in tying parcels, consisting of the combination of a frame carrying a wheel or reel which is movable upon an axis, and around which the twine is passed, and from which it is drawn for use, and which is made to recoil when the cord is released, thus winding up again a portion of the cord, substantially as shown, for the purpose specified.

2. The combination of wheel or reel with the coiled spring, said reel made to coil in the frame with twine attached, for the purpose specified.

HOMER W. PRINDLE.
CHARLES H. PRINDLE.

Witnesses:
GUS T. PETERSON,
W. B. MICHAEL.